United States Patent Office 2,777,499
Patented Jan. 15, 1957

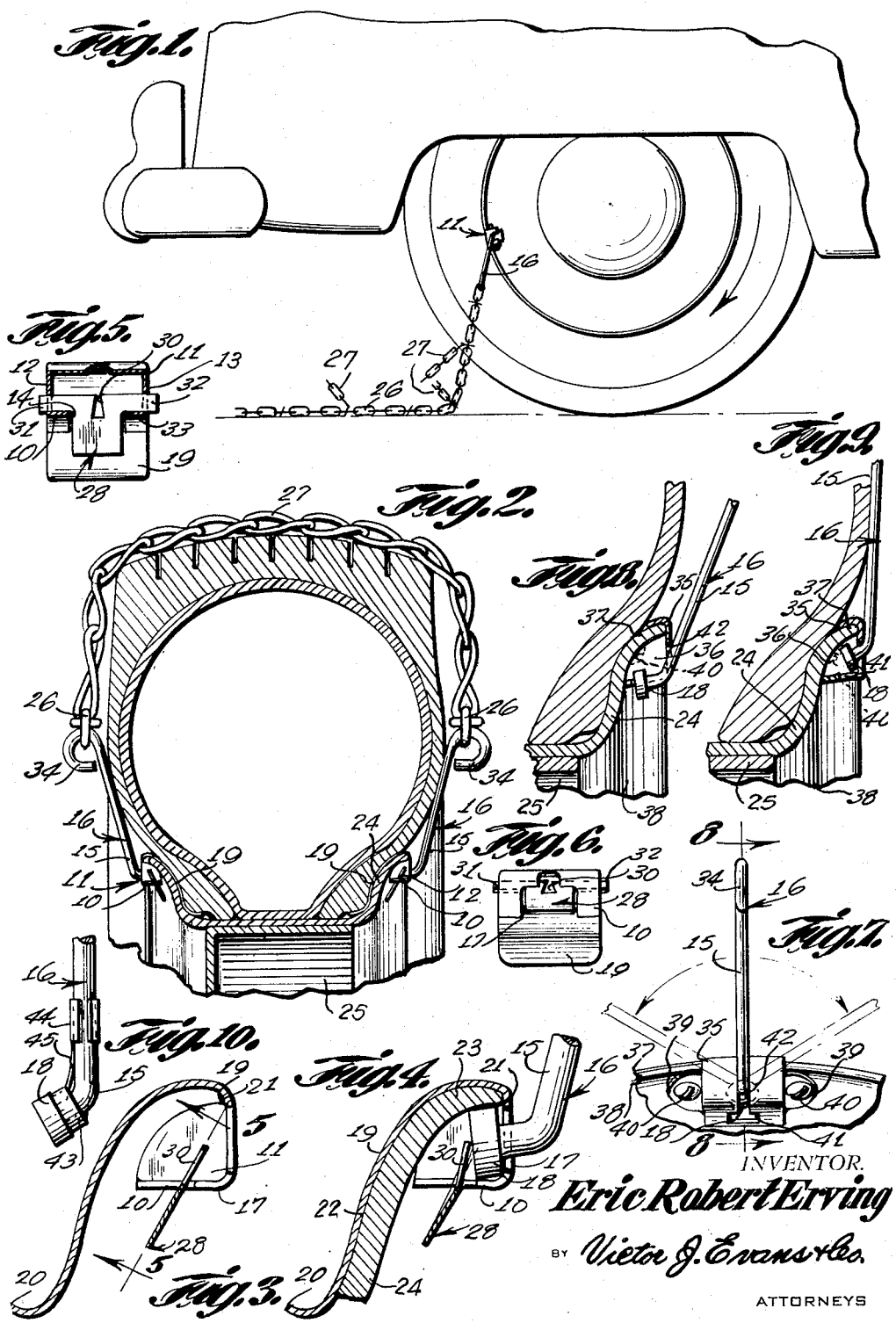

2,777,499

WRAP-ON TIRE CHAIN APPLICATOR

Eric Robert Erving, Baker, Oreg.

Application September 28, 1954, Serial No. 458,885

4 Claims. (Cl. 152—213)

This invention relates to devices for applying tire chains to wheels of motor vehicles, and in particular, an attachment for retaining lugs or receivers on rims of wheels whereby ends of tire chains are adapted to be hooked to the rims so that upon rotation of the wheels the chains are wrapped on the wheels.

The purpose of this invention is to provide means for connecting ends of tire chains of motor vehicles to the wheels so that the chains are drawn around the tires of the wheels with positive movements and vehicles having wheels in ice, snow, mud and the like are readily driven forwardly or rearwardly.

Various types of devices have been provided for applying chains to wheels of motor vehicles, however, where the attaching devices extend around the tires, it is difficult to make connections on the insides of the wheels and, particularly, with the low fenders of motor vehicles, it is difficult to work the chains over the tires. With this thought in mind, this invention contemplates lugs mounted directly on rims of the wheels of motor vehicles whereby a tire chain is drawn into place by a turning movement of the wheel.

The object of this invention is, therefore, to provide connecting elements for attaching tire chains to wheels of motor vehicles in which the connecting elements are applied to rims of the wheels.

Another object of the invention is to provide means for attaching ends of tire chains to wheels of motor vehicles in which the chains are adapted to be used for moving a vehicle from ice, snow, mud and the like without attaching the free end of the chain to the wheel or end of the chain attached to the wheel.

Another important object of the invention is to provide a device for connecting ends of tire chains to wheels of motor vehicles in which connecting elements are adapted to be permanently mounted on rims of the wheels of the vehicle.

A further object of the invention is to provide a wrap-on tire chain applicator in which the device is of a simple and economical construction.

With these and other objects and advantages in view, the invention embodies a socket having a T-shaped slot therein with means for mounting the socket on the rim of a wheel of a vehicle and bolts extended from ends of tire chains and having heads adapted to be inserted in the T-shaped slots for temporarily connecting ends of the chains to the rims of the wheels.

Other features and advantages of the invention will appear from the following description taken in connection with the drawing, wherein:

Figure 1 is a side elevational view showing a rear portion of a motor vehicle with a tire chain connected to a receiver or socket on the rim of the wheel of the vehicle.

Figure 2 is a cross section through one side of a wheel of a motor vehicle showing the ends of a tire chain held in sockets on the rim of the wheel with one of the cross chains of the tire chain being extended over a tire on the rim, the other cross chains and also parts of the chains on the side being omitted.

Figure 3 is a cross section through the socket and mounting clip illustrating the holding device with the parts shown on an enlarged scale.

Figure 4 is a section similar to that shown in Figure 3 showing the head of a bolt extended from a tire chain secured in the socket.

Figure 5 is a section through the socket taken on line 5—5 of Figure 3 illustrating the spring locking element for retaining the head of a bolt in the socket.

Figure 6 is a view looking upwardly toward the lower side of the socket.

Figure 7 is a detail showing a side elevational view of the tire chain-holding socket with a bolt adapted to be held in the socket and parts of the rim of a wheel shown in broken lines.

Figure 8 is a cross section through one side of the rim of a wheel illustrating a modification wherein the receiver or socket is secured to the rim of the wheel, such as by welding, and wherein the head of one of the bolts of the cross members of the tire chain is shown as being inserted in the socket.

Figure 9 is a section similar to that shown in Figure 8 showing the head of the bolt in the socket.

Figure 10 is an elevational view showing a head of a bolt with a retainer spring clip positioned thereon and with the upper part of the bolt broken away.

Referring now to the drawing, wherein like reference characters denote corresponding parts, the wrap-on tire chain applicator of this invention includes a socket, L-shape in cross section, having a base 10, a side wall 11, and end walls 12 and 13 and, as shown in Figure 5, the wall 11 is provided with a slot 14 for receiving a shank 15 of a bolt 16, and the slot 14 opens into an elongated slot 17 that is positioned to receive a head 18 of the bolt whereby the bolt is adapted to be inserted through the slot 17 with the shank passing into the slot 14 and with the head positioned in the socket whereby the bolt is secured therein.

In the design illustrated in Figures 2, 3 and 4, the socket is provided with an arcuate mounting plate 19 which extends from a point 20 to a point 21 whereby the intermediate portion is patterned to nest against the inner surface 22 of a flange 23 of a rim 24 of a wheel 25. The mounting plates 19 are adapted to be inserted between the walls of the tire and inner surfaces of the flanges of the rim with the tire deflated. With the device in position the tire is inflated and with the heads of the bolts 16, which extend from ends of the tire chains 26 in the sockets the chain is wrapped around the surface of a tire with the wheel on which the tire is positioned traveling forwardly. With the chain wrapped around the tire, the ends of the chain are readily connected by conventional means.

As illustrated in Figures 4 and 5, the socket is provided with a spring plate 28 having a slot 30 positioned at the center and having wings 31 and 32 adapted to extend from the sides whereby with the intermediate portion of the plate extended through a slot 33 in the lower part of the socket, also as shown in Figure 4, the head 18 of the bolt will engage the upper portion of the spring plate bending the intermediate portions of the wings 31 and 32 whereby the head 18 of the bolt is frictionally secured in the socket.

The bolts 16 are secured to the chains 26 with eyes 34 that are extended through links of the chains.

In the design illustrated in Figures 7, 8 and 9, sockets 35 having flanges 36 are secured to outer surfaces of rims 37 of wheels 38 with tabs 39 through which screws 40 extend, and these sockets are adapted to retain heads of bolts, such as the bolt 16, in slots having wide portions 41, similar to the slot 17, and narrow portions 42, similar to the portion 14, shown in Figure 4. The sockets 35 are secured, such as by welding, however, it will be understood that they may be secured by other suitable means.

With the ends of longitudinally disposed chains of tire chains provided with bolts having heads, such as the bolts 16 and heads 18, the sockets 11 are adapted to be secured to the opposite sides of rims of a wheel, such as illustrated in Figure 7, or by the arcuate mounting plates 19, particularly as shown in Figures 3 and 4, and with the sockets in position on the rims, heads of bolts on the ends of said longitudinally disposed chains are readily inserted in the T-shaped slots whereby ends of the chains are secured on wheels of a vehicle and as the wheels are rotated the chains are wrapped over the tires on the wheels. In an emergency, such as with a vehicle in snow, ice, or mud, the wheels are rotated with the ends of the chains held in the sockets and it may not be necessary to connect ends of the chains. However, for normal use, the ends of the chains are connected by conventional means after being wrapped over the tires of the wheels.

The lugs in which the sockets are formed may, therefore, be permanently secured to the wheels, or may be installed by deflating tires on the wheels, positioning the mounting plates, as shown in Figure 2, and inflating the tire.

In the design shown in Figure 10, the bolts are provided with collars 43 and a spring clip 44 on the end of a bar 45 provides resilient means for retaining the heads 18 of the bolts 16 in the T-shaped slots of the clips or sockets.

The lugs in which the sockets are formed, such as the parts 11 and 35 may also be provided with bolt head retaining springs, such as the springs 28, or the springs may be omitted, as the bolt heads such as the heads 16 will automatically become secured in the T-slots when the chains are pulled tight or snug, wherein the bolt head bears against the inner surface of the vertical portion of the slot, as shown in Figures 4 and 9, obviating the necessity of the spring except as an additional safety measure.

It will be understood that other modifications, within the scope of the appended claims, may be made in the design and arrangement of the parts without departing from the spirit of the invention.

What is claimed is:

1. A tire chain comprising spaced longitudinally disposed chains connected with cross chains, and having shanks with heads on ends thereof extended from the ends, and hollow lugs, L-shaped in cross section having horizontally disposed and vertically disposed legs, said vertically disposed legs having slots adapted to receive the shanks extended from the chains therein and the horizontally disposed legs having recesses for receiving heads of the shanks therein, and said sockets being adapted to be positioned on a rim of a wheel for temporarily retaining ends of said longitudinally disposed chains on said rims.

2. In a tire chain applicator, the combination which comprises a socket, L-shape in cross section, having a horizontally disposed leg and a vertically disposed leg and said legs having slots therein with the slot in the vertically disposed leg adapted to receive a shank of a bolt and with the slot in the horizontally disposed leg adapted to receive a head of a bolt, and a spring also positioned in the socket and adapted to frictionally engage a head of a bolt positioned therein, said socket adapted to be secured to the rim of a wheel of a motor vehicle.

3. In a tire chain applicator, the combination which comprises spaced horizontally disposed chains connected with cross chains and having bolts extended from the longitudinally disposed chains at one end of the tire chain, said bolts having heads on extended ends thereof, sockets, L-shape in cross section, having horizontally disposed sections and vertically disposed sections and having arcuate mounting plates extended from upper edges of the vertically disposed sections, said sockets having T-shaped slots therein positioned to receive heads and shanks of the bolts of the longitudinally disposed chains of the tire chains, and a spring in the socket for frictionally engaging the head of a bolt positioned therein.

4. A tire chain assembly comprising spaced longitudinally disposed chains connected with cross chains, said longitudinally disposed chains having bolts with heads on ends thereof at the ends, and sockets L-shaped in cross section having vertically disposed legs and horizontally disposed legs and having slots adapted to receive the heads of the bolts in the horizontally disposed legs with shanks of the bolts in slots of the vertically disposed legs, said sockets being adapted to be positioned on rims of wheels with a socket on each side of the rim of the wheel, and with the tension of the chains retaining the heads of the bolts against inner surfaces of the sockets.

References Cited in the file of this patent

UNITED STATES PATENTS

| | | |
|---|---|---|
| 1,292,526 | Silberman | Jan. 28, 1919 |
| 1,495,168 | Drew | May 27, 1924 |
| 2,617,464 | Trumbull | Nov. 11, 1952 |
| 2,681,681 | Muller | June 22, 1954 |